United States Patent
Backfolk et al.

(10) Patent No.: US 9,273,428 B2
(45) Date of Patent: Mar. 1, 2016

(54) METHOD FOR PRODUCING PARTICLES ELECTROSTATICALLY

(75) Inventors: Kaj Backfolk, Imatra (FI); Isto Heiskanen, Imatra (FI); Ali Harlin, Kerava (FI)

(73) Assignee: Stora Enso OYJ, Helsinki (FI)

( * ) Notice: Subject to any disclaimer, the term of this patent is extended or adjusted under 35 U.S.C. 154(b) by 1257 days.

(21) Appl. No.: 12/919,943

(22) PCT Filed: Feb. 26, 2009

(86) PCT No.: PCT/IB2009/000365
§ 371 (c)(1),
(2), (4) Date: Sep. 15, 2010

(87) PCT Pub. No.: WO2009/106968
PCT Pub. Date: Sep. 3, 2009

(65) Prior Publication Data
US 2011/0000847 A1    Jan. 6, 2011

(30) Foreign Application Priority Data
Feb. 29, 2008  (SE) ...................................... 0800490

(51) Int. Cl.
| | | |
|---|---|---|
| *B05B 5/057* | (2006.01) | |
| *B05D 1/04* | (2006.01) | |
| *D01D 5/00* | (2006.01) | |
| *D04H 1/728* | (2012.01) | |
| *D21C 5/02* | (2006.01) | |
| *B05D 1/00* | (2006.01) | |
| *B05D 1/06* | (2006.01) | |
| *D21H 19/38* | (2006.01) | |
| *D21H 23/50* | (2006.01) | |

(52) U.S. Cl.
CPC . *D21C 5/02* (2013.01); *B05B 5/057* (2013.01); *B05D 1/007* (2013.01); *B05D 1/04* (2013.01); *B05D 1/045* (2013.01); *B05D 1/06* (2013.01); *D01D 5/003* (2013.01); *D01D 5/0023* (2013.01);
(Continued)

(58) Field of Classification Search
CPC ... D01D 5/0023; D01D 5/003; D01D 5/0038; D01D 5/0061; D01D 5/0069; D01D 5/0084; D01D 5/0092; D04H 1/728; B05B 5/057; B05D 1/007; B05D 1/04; B05D 1/045; B05D 1/06
USPC .............. 156/62.4, 167, 181, 273.1; 264/465, 264/484, 115
See application file for complete search history.

(56) References Cited

U.S. PATENT DOCUMENTS

| | | |
|---|---|---|
| 3,147,137 A | 9/1964 | Glass et al. |
| 6,604,925 B1 * | 8/2003 | Dubson ............................ 425/6 |

(Continued)

FOREIGN PATENT DOCUMENTS

| | | |
|---|---|---|
| WO | 03064006 | 8/2003 |
| WO | 2006090006 | 8/2006 |

(Continued)

OTHER PUBLICATIONS

International Search Report which issued in International Application No. PCT/IB2009/000365, dated Sep. 2, 2009.

*Primary Examiner* — Michael Tolin
(74) *Attorney, Agent, or Firm* — Greer, Burns & Crain, Ltd

(57) ABSTRACT

The invention refers to a method for forming particles or droplets of at least one substance comprising the steps of providing a foamed medium, which foamed medium comprises said substance, and forming particles or droplets of said substance at least partly by electrostatic processing. The use of foamed medium in electrostatic processing enables higher production speeds and increases the evenness of a coating layer formed by electrospinning or electrospraying the particles or droplets on a substrate.

16 Claims, 1 Drawing Sheet

(52) U.S. Cl.
CPC ............ *D01D 5/0038* (2013.01); *D01D 5/0061* (2013.01); *D01D 5/0069* (2013.01); *D01D 5/0084* (2013.01); *D01D 5/0092* (2013.01); *D04H 1/728* (2013.01); *D21H 19/38* (2013.01); *D21H 23/50* (2013.01); *Y02W 30/648* (2015.05)

(56) References Cited

U.S. PATENT DOCUMENTS

| | | | |
|---|---|---|---|
| 8,337,742 B2 * | 12/2012 | Sunthornvarabhas et al. | 264/465 |
| 2003/0226750 A1 * | 12/2003 | Fenn | 204/164 |
| 2006/0068668 A1 * | 3/2006 | Kameoka et al. | 442/340 |
| 2006/0266485 A1 | 11/2006 | Knox et al. | |
| 2007/0148365 A1 | 6/2007 | Knox et al. | |
| 2010/0001438 A1 * | 1/2010 | Kishimoto | 264/465 |

FOREIGN PATENT DOCUMENTS

| | | |
|---|---|---|
| WO | 2006127312 | 11/2006 |
| WO | WO 2008/010307 A1 * | 1/2008 |
| WO | 2008023092 | 2/2008 |
| WO | 2009042128 | 2/2009 |

\* cited by examiner

METHOD FOR PRODUCING PARTICLES ELECTROSTATICALLY

This application is a U.S. National Stage under 35 U.S.C. §371 of International Application No. PCT/IB2009/000365, filed Feb. 26, 2009, which claims priority from Swedish Patent Application No. 0800490-5, filed Feb. 29, 2008.

FIELD OF THE INVENTION

The invention relates to a method for forming particles or droplets by electrostatic processing. It further relates to a medium for electrostatic particle formation, a method for forming paper or paper board, a paper or paper board, a method for forming a filter, a filter and a method for removing or eliminating foam from a medium.

BACKGROUND OF THE INVENTION

Electrostatic techniques, such as electrospinning and electrospraying, are used for the production of sub-micron particles in many fields. In electrospray, a high voltage electric field is applied to a surface of a liquid causing the emission fine charged droplets. The electrospinning technique is similar to the electrospraying technique. However, in electrospinning, fibres are formed from the liquid instead of droplets due to viscoelastic forces.

An apparatus for electrospraying or electrospinning typically comprises nozzles, which feed a liquid medium that comprises the substance that is to be formed into sub-micron particles, and a collector plate. The electrospray- or electrospin-medium is typically a polymer containing liquid, such as a polymer solution or a melt. An electrical potential difference is applied between the nozzles and the plate. The electrostatic field created between the nozzles and the collector plate causes the medium to overcome cohesive forces that hold the medium together, whereby jetting occurs towards the collector plate. The electrostatic field stretches the jet and, depending on the properties of the liquid medium, such as viscosity, surface energy, polymer concentration, and the strength of the electric field, fibres (electrospin) or droplets (electrospray) are formed which are deposited on the collector plate. The formed fibres or droplets can be collected as such or being deposited as a coating on a substrate covering the collector. The principle of electrostatic coating is, e.g., summarized in the literature by Ramakrishna et al. [An Introduction to Electrospinning and nanofibers, World Scientific Publishing co. Pte. Ltd., 2005]. Applications of the technique in the paper and board industry has, however, been limited and not extensively reported.

US2007/0148365 discloses a method of forming paper or paper board wherein a coating of nanofibers is applied to the papersurface using an electrospinning device. The electrospinning device used in US2007/0148365 comprises a plurality of meniscus initiators forming areas of concentrated charge in the fiber-forming composition. However, the system disclosed in US2007/0148365 is limited to applications wherein the fibre formation is directed upwards. Furthermore, the performance of such an electrospinning device is dependent on the number, geometry, position and performance of said meniscus initiators.

US2006/0266485 discloses a method for applying nanofibres to a paperweb by electrospinning. According to the method disclosed in US2006/0266485, the fibres are applied to the paper web in certain zones where the dryness of the paper web is favourable for the application of nanofibres.

In the art, problems with un-uniform deposition of the particles or droplets formed by electrospray/electrospinning techniques have been observed. This may be due to the feeding nozzles producing lines of spun fibres or droplets. Furthermore, the eject of the jet from one feeding nozzle is oftentimes unstable, as it may start and stop randomly and the production rate may vary. Another factor that limits the use of electrospray/electrospinning techniques is the low production rate related to these techniques. Attempts of increasing the production rate by the use of higher electric fields are usually unsuccessful, since too high charges might cause electrostatic discharge. Moreover, spray nozzles with small orifice diameters, typically used in the systems described in the prior art, are susceptible to clogging and drying of chemicals in the electrospray/electrospin medium may occur. This may deteriorate the production rate even further.

SUMMARY OF THE INVENTION

One object of the present invention is to provide a method for forming particles or droplets that do not involve the problems of the prior art.

Another object of the present invention is to provide a method for forming sub-micron particles or droplets, which method enables high speed production.

Yet another object of the present invention is to achieve a uniform deposition of electrosprayed or electrospinned particles or droplets on a surface.

The above-mentioned objects, as well as other advantages, are attained by the method according to the invention. The invention relates to a method for forming particles or droplets of at least one substance comprising, in the said order, the steps of; providing a foamed medium, which foamed medium comprises said substance, and forming particles or droplets of said substance by electrostatic processing.

As used herein, the term "particles" includes particles in any form, including, but not limited to, fibres.

By the term "foamed medium" or "foam" as used herein means a dispersion of gas in a solid or in a liquid. The gas globules may be of any size, e.g. from colloidal to macroscopic.

The scope of electrostatic processing includes any process wherein particles or droplets are formed electrostatically, including, but not limited to, electrospraying (generation of droplets) and electrospinning (generation of fibers), as well as combinations of the two in the transition range between electrospraying and electrospinning.

Surprisingly, it has been shown that the use of foamed medium in electrostatic processing enables higher production speeds and increases the evenness of a coating layer formed by electrospinning or electrospraying the particles or droplets on a substrate. Moreover, problems with electrostatic discharge between the system feeding the medium, e.g. nozzles, and the deposition surface can be avoided.

The above objects have also been achieved by a medium for electrostatic particle formation, which medium comprises at least one substance that is to be formed into particles or droplets and wherein said medium is in the form of foam.

The invention further relates to a method for forming a paper or paperboard comprising the steps of; forming a web of paper or paper board, providing a foamed medium comprising at least one substance to be deposited on said web of paper or paper board, forming particles or droplets of said substance by electrostatic processing, and depositing said particles or droplets on said web of paper or paper board. Furthermore, the invention relates to a paper or paper board formed by said method for forming a paper or paper board.

Said method for forming paper or paperboard enables coating and sizing of paper or board at high coating speeds. Moreover, smooth and uniform layers of the applied coating and/or sizing on the paper or paper board are obtained.

The invention further relates to a method for forming a filter comprising a substrate layer and an electrospun fibrous layer, said method comprising the step of electrospinning fibres from a foamed medium onto said substrate. Furthermore, the invention relates to a filter produced by said method.

The method for producing a filter according to the invention gives rise to a close and uniform distribution of the fibres on the substrate, whereby filters with high filtering efficiencies can be produced.

The invention further relates to a method for removing or eliminating foam from medium, said method comprising the step of subjecting said medium to an electrostatic field. By the method for eliminating or removing foam from a medium according to the invention, most of the free gas bubbles in the medium is efficiently removed and separated so that problems caused by an excess amount of free gas bubbles is eliminated. Said medium may be solid or liquid medium comprising foam.

SHORT DESCRIPTION OF THE DRAWINGS

DETAILED DESCRIPTION OF THE INVENTION

Figure 1A:
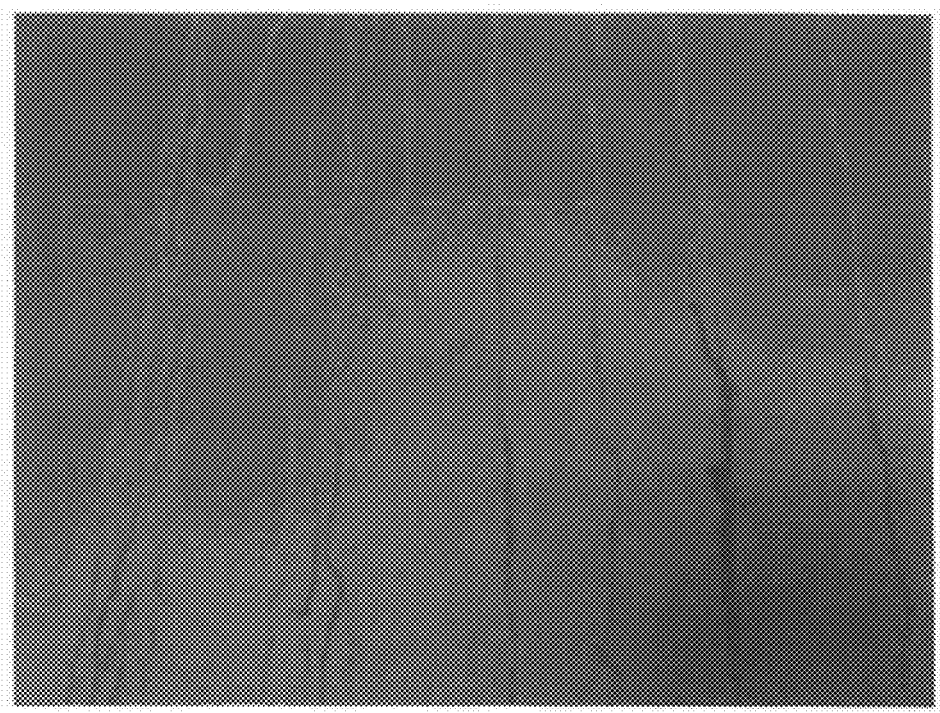
FIG. 1a shows a photo taken under UV light of a paper board coated with particles that have been electrospun from a liquid in accordance with a comparative example (comparative example 1), representing the prior art.

The present invention relates to the formation of particles or droplets of at least one substance by electrostatic means, wherein the medium comprising the substance that is to be formed into particles or droplets is in the form of foam. Said medium may also be referred to as a foamed medium. The particles formed may be of micro-, nano- and/or millimeter size. According to the invention, the formation of particles or droplets takes place from the surface of the foam and/or from the surfaces of the bubbles incorporated in the foam. In a preferred embodiment, the particles or droplets formed by the method according to the invention do not contain any gas. Thus, the foam is not transferred or deposited on a collector as foam, but as particles or droplets.

The use of foamed medium for the formation of particles by electrostatic processing makes it possible to utilize higher electric field strengths without causing electrostatic discharge between the feeding system and the collector plate. Without wishing to be bound to any theory, this is probably due to the dielectric properties of foam. The application of higher electric field strengths increases the production rate. Moreover, the feed system, e.g. nozzles carrying the foamed medium, may be arranged close to the collector or to the substrate to be deposited by the formed particles, without causing uneven deposition. This further contributes to a higher production rate.

Moreover, it has been shown that less energy is needed in order to initiate the formation of particles from a foamed surface than from a non-foamed liquid. The production of particles or droplets from a foamed surface may be initiated or "ignited" by an instantaneous increase in voltage point-wise, i.e. by applying a voltage at a single point or location. As the jet-formation has sprung into action at this specific point, it pervades rapidly and expands to the whole free foam surface. The system can even be ignited at a single point using a fuse, after which, from this point, the spinning process spreads across the whole foamed surface. Thereafter, the ignition point is no longer needed and the voltage applied can be decreased. Thus, a smaller amount of energy provided as electricity is needed to overcome the surface tension and induce formation of a fibre or droplet when using foam as a medium.

Yet another advantage with the use of a foamed medium as e-spinning or e-spraying medium is that the solid content of the medium may be high, compared to when a liquid medium is used. Consequently, wood fibre materials, e.g. fine grounded cellulose material or cellulose nano fibres, may be mixed with a gas to form foam and thereafter formed into particles or droplets by electrostatic means.

The foamed medium used in the present invention, may be provided by dispersing a gas in a liquid or in a solid, which liquid or solid comprises the substance that is to be formed into particles or droplets. Alternatively, the foamed medium may be provided by first dispersing a gas in a liquid or in a solid, whereafter the substance is incorporated, e.g. impregnated or spread, into the formed dispersion.

When forming particles or droplets electrostatically from the foamed medium, the foamed medium may be consumed in the process. According to this embodiment, the foamed medium may consist of the substance that is to be formed into particles or droplets, solvent that is evaporated in the process and gas. Alternatively, the foamed medium may work as a support for the substance that is to be formed into particles. According to this embodiment, the foamed medium is not consumed in the process. For example, a polymer solution, which solution comprises the polymer that is to be formed into particles or droplets and the solvent that is evaporated in the process, may be incorporated in the foam.

The foamed medium of the present invention may comprise a gas dispersed in a liquid or in a solid in an amount of at least 5% by volume of the total medium, or in an amount of between 10-99% by volume, more preferably in an amount of 50-99% by volume and most preferably in an amount of 75-99% by volume of the total medium. A high amount of gas in the foam gives rise to small bubbles of uniform size distribution dispersed in the liquid or solid. Consequently, the total area of the surfaces of the bubbles is increased, from which surfaces the particles or droplets are formed. Furthermore, the uniform size distribution of the bubbles contributes to a more uniform process. The foamed medium may also be described as an elastic sponge-like composite of gas and viscous liquid, which composite comprises bubbled air in a liquid. It is essential that the amount of gas present in the foamed medium is enough to overcome the solvent power of the liquid. Thus, that at least part of the gas forms bubbles in the liquid. The gas bubbles present in the liquid phase may be of any size, from colloidal to macroscopic.

The foamed medium of the invention can be biologically, chemically, mechanically or acoustically prepared. Oftentimes, it is most practical to prepare the foam by mechanical means.

The gaseous component of the foamed medium may be selected from the group consisting of air, carbon dioxide ($CO_2$), steam ($H_2O$), nitrogen gas ($N_2$), hydrogen gas $H_2$) and a mixture thereof. In one preferred embodiment, the gaseous component is air. Air is oftentimes the most convenient choice when incorporating the gas in the liquid by, e.g., mechanical means.

The liquid phase of the foamed medium may be a solution, a dispersion or a melt of the substance that is to be formed into particles or droplets. Preferably, the liquid phase further comprises a carrier. A carrier refers to a liquid which has the purpose of participating in transporting, holding, conducting and optionally solving the substance to be formed into particles or droplets. The carrier may, e.g., be water, alcohols or organic solvents or mixtures of solvents.

The substance or substances to be formed into particles or droplets may be polymers or a blend of polymers. Suitable polymers may be chosen from e.g. polyolefins, polyvinyls, polyamides, polyimides, polyacrylates, polyesters, and mixtures thereof.

The liquid phase may further comprise at least one process aid contributing to an effect selected from foam formation, improving the static electric field and intensifying the particle formation. Preferably, the process aid is a surface active agent (a surfactant), e.g. a surface active polymer. In one preferred embodiment, the process aid is a foam forming agent, e.g. an azide.

The foamed medium may further comprise stabilizing agents to ensure acceptable retention of the gas phase in the liquid phase. In one preferred embodiment of the present invention, the foamed medium may comprise fine particles. The presence of fine particles in the foamed medium intensifies the particle formation and improves the stability of the foamed medium. As used herein, "fine particles" refers to solid additives. The fine particles present in the foamed medium may, e.g., have a spherical diameter of 1-1000 nm. The fine particles may e.g. be proteins, bio-originated polymers, such as starch; mineral particles, such as clays, silicas, calcium carbonates, titanium oxides, talcum; organic intensifiers, synthetic latex binders, salts; and derivatives thereof.

In one embodiment of the invention, the formation of particles is carried out by electrospinning, whereby ultrafine fibres are formed. The diameter of single fibres may, e.g., be less than 5 µm or even less than 400 nm. The formation of particles may also be carried out by electrospraying, whereby droplets are formed.

The present invention is applicable to any field of application wherein electrospinning and/or electrospraying is used today, e.g. for electrostatic coating or impregnation of a substrate or for the production of non-woven fabrics. The particles formed by the method of the invention may be deposited on a collector surface. The collector surface may be a substrate such as a film, a fibre web, paper, foil, or any other suitable substrate.

In one embodiment of the invention, the particles or droplets formed by the method are deposited on a paper or paper board substrate. The particles or droplets can, e.g., be applied to a moving web of paper or paper board during the paper making process. The method of the invention can thus be used for e.g. coating or sizing of paper or board. The method may be used to incorporate various types of polymer fibres, directly onto or incorporated into the surface of paper or board. One remarkable advantage of the present invention is that the coating speed, as g/[m$^2$× min], can be increased to a level not reached using arrangements according to the state of the art. By the method according to the invention, a high amount of coating can be produced in a short time. Moreover, the use of foamed medium counteracts the problem with one coating nozzle interfering the magnitude of the electric field at an adjacent nozzle. Consequently, the coating nozzles may be arranged closer to each other, whereby compact coating systems may be used.

The method according to the invention may further be used to produce filters comprising a substrate layer and an electrospun fibrous layer. This embodiment includes the formation of fibres from a foamed medium in an electrostatic field, which fibres are deposited on a substrate layer. The substrate layer is advantageously made of a conventionally produced fabric which has a fairly porous structure. A filter prepared by the method according to the invention gives rise to enhanced filtering properties since the electrospun fibres are uniformly deposited on the substrate layer.

According to yet another embodiment of the present invention, small particles are produced from the foamed medium, which small particles are collected as such. Said small particles may be in the form of discontinuous fibres or irregular beads or mixtures, agglomerates or combination thereof. Said particles have at least one dimension of sub-micron-scale. Preferably particles are fibres having diameters below 10 µm, more preferably below 1 µm. The formed particles may first be deposited on a collector surface, from which the particles are yielded. The particles may be prevented from adhering to the collector surface. The system may further be designed so that the produced particles are continuously removed from the collector surface. By the method of the invention, high yields of particles can be achieved.

The method of the invention may further be used to produce fibrils or microfibrillated cellulose, i.e. about 50 nm thick strings of cellulose. According to the invention, fibrils may be produced by dissolving cellulose, forming a foamed medium of the dissolved cellulose and electrospinning said foamed medium. Fibrils produced according to the invention may, e.g., be used to reinforce plastics, high-strength papers and environmentally friendly packaging.

The electrostatic particle formation of the present invention may be carried out by means of a conventional apparatus suitable for electrospraying or electrospinning. The apparatus may comprise a collector, a feed section and a voltage source adapted to provide an electrical potential difference between the collector and the feed section. The feed section may further comprise a foam spreading or foam feeding system. The collector may be a metal plate for supporting the substrate, although a plate, a roll, a drum, a cylinder or the like also may be possible to use. The electrostatic voltage is preferably between 10 and 100 kV, more preferably between 40 and 60 kV, and the distance between the foam and the substrate is preferably between 10 and 300 mm, more preferably about 50 mm.

The electrostatic processing, e.g. electrospraying or electrospinning, of the particles or droplets can be conducted using both direct and/or alternating voltages. In one embodiment of the invention, the electrostatic processing is performed in the presence of an alternating current (AC) electric field. This can be achieved by applying an alternating electrical potential to either of the electrodes forming the electric field, e.g. an alternating electrical potential can be applied either to the feed section or to the collector. The use of AC potentials gives rise to an improved coverage of the deposited surface by the formed particles or droplets. Foamed medium facilitates the use of AC potentials due to the dielectric properties of foam.

The electrostatic processing may also be performed using both alternating current and direct current simultaneously. In this way, the form of the particles produced in the process may be varied. According to one embodiment, an alternating electrical potential is applied to the collector and a direct electrical potential is applied to the feed section, whereby particles in the form of quite large fibres may be produced. In another embodiment, an alternating electrical potential is applied to the feed section and a direct electrical potential is applied to the collector, whereby more fine particles may be produced.

The feed section of the apparatus suitable may, e.g. be a smooth plate, on which the foamed medium may be allowed to slowly moving downwards to a discharging slot. At the discharging slot, the particle forming medium is drawn to the collector by the electrostatic field. The jets formed are stretched directly from several random locations of the foam surface. The viscous properties of foam are beneficial for such a feed system.

In another embodiment, the foam may be fed through an opening, e.g. a slit provided with a variable slit width. Optionally, the surface tension and the slit width can be adjusted so that the foam does not flood out but yet provides sufficient free surface area for production of jets.

In yet another embodiment, the feed system may comprise one or a number of nozzles. The use of foamed medium counteracts the problem with one nozzle interfering the magnitude of the electric field at an adjacent nozzle. Consequently, the nozzles may be arranged closer to each other, whereby compact feed systems may be used.

According to a preferred embodiment, the particle formation is carried out from a free, preferably flat, surface of the foamed medium, i.e. without the use of any nozzles or the like. Foamed medium facilitates the formation of particles or droplets from a free surface since high peaks of charges in the medium, which might cause discharge, are avoided. The formation of particles or droplets from a free surface of a foamed medium by electrostatic means gives rise to a surprisingly high production rate. Furthermore, the possibility of using a free surface of the foamed medium gives rise to an increased flexibility when designing the feed system. According to this embodiment, the feed system may comprise a flat surface, e.g. a metal plate, or it may comprise a bended surface.

The formation of particles or droplets according to the invention may be carried out using electrostatic means in combination with other forces, e.g. in combination with the use of mechanical means. Thus, the use of an electrostatic field may, e.g. be combined with the use of rotating nozzle systems or pressurized feeding systems to further improve the jetting.

The invention may further be used to remove or eliminate foam from a medium, which medium comprises foam. The formation of foam in fluent medium is a problem in many industrial processes, e.g. in the paper industry, in the food industry, in the pharmaceutical industry and in the ink industry. In the art, foam formation is typically prevented by the use of defoaming agents or, alternatively, the gas is eliminated by the use of mechanical degassing devices such as centrifugal apparatuses. However, the traditional degassing devices are often space demanding and costly.

According to the invention, the medium comprising gas in the form of foam is subjected to an electrostatic field, i.e. an electric potential difference is applied between the medium and a collector. In this way, particles or droplets are electrostatically formed from the surface of the foam and/or from the surface of the bubbles incorporated in the foam whereby the bubbles in the foam are broken. Consequently, the gas is released and thus removed from the medium. The particles formed by the method are deposited on the collector and may be recycled.

Said method for eliminating or removing foam is applicable to treatment of fluid process medium from several industries, e.g. from the paper making process, the food industry, the pharmaceutical industry, the paint industry and the ink industry. The fluid medium may be based on water, alcohols or organic solvents or mixtures of solvents. The fluid medium may be in the form of a melt. Alternatively, the fluid medium may be a suspension, such as a fibre suspension, e.g. a suspension of cellulosic fibres for papermaking (so called stock) or effluent water from the papermaking machine. When treating white water by the method according to the invention, small, hydrophobic particles may be generated and deposited on the collector plate, such as vaxes, starches and proteins. These particles may be recycled to the fibre suspension.

The method of removing foam can advantageously be used as one step in a flotation process, e.g. in the deinking of a recycled pulp slurry. In a flotation process, air is injected to a fluid medium (e.g. to a recycled pulp slurry) which forms bubbles to which hydrophobic particles (e.g. printing ink particles) attach. The bubbles move to the surface of the suspension where they form a foam layer. In the prior art, this foam layer is removed by mechanical means. According to the invention, this foam layer may be removed by subjecting it to an electrostatic field. Thus, an electric potential difference may be applied between the medium and a collector, whereby particles (e.g. ink particles) are electrostatically formed and deposited on the collector, simultaneously as the air bubbles are destroyed. In this way, the foam may be removed and the ink particles may be recovered.

The method of removing or eliminating foam from a medium according to the present invention may be carried out by means of a conventional apparatus suitable for electrospraying or electrospinning. Such an apparatus has been described above in connection with the method of forming particles. The apparatus may, as described above, comprise a collector, a feed section and a voltage source adapted to provide an electrical potential difference between the collector and the feed section. The feed section may further comprise a foam spreading or foam feeding system. The collector may be a plate, a roll, a drum, a cylinder or the like.

In one preferred embodiment of the method of removing or eliminating foam from a medium, the medium is spread on a surface, e.g. on a metal surface, forming a thin film of liquid, whereafter it is subjected to an electrostatic field. In this way, gas bubbles in the medium rises faster to the surface of the medium, which facilitates the electrostatic formation of particles or droplets, and thus the elimination of foam, from the medium.

The electrostatic processing, e.g. electrospraying or electrospinning, to remove or to eliminate foam can be conducted using both direct and/or alternating voltages.

EXPERIMENTAL

The invention is further described with reference to some examples below. It is to be understood that the invention is not limited to the particular process steps and materials disclosed herein.

To highlight the difference, a comparative experiment following procedure representing state of the art was conducted as well.

Comparative Example 1

An intermediate composition comprising a mixture of titanium dioxide, polyvinyl alcohol, polyethylene oxide, ($TiO_2$+PVA+PEO), as compounds to be formed into particles; sodium dodecyl sulphate (SDS) as process aid and water as carrier was prepared. The concentrations of the ingredients in a batch of 500 g, were PVA 6.4%, PEO 1.0%, SDS 3 drops and water to balance. This intermediate composition was electrospun from nozzles (nozzle distance about 50 mm, voltage about 40 kV). The particles were deposited on a paperboard of 240 g/$m^2$.

The results were assessed visually and also by taking photographs under UV light. FIG. 1a shows a photo of the coated board taken under UV light. $TiO_2$ is used as a marker of spread uniformity, as it absorbs UV light and thus the coating can be seen as dark lines. During spinning only one jet was observed leaving one nozzle. Skin effect was observed on the nozzles. As can be observed in FIG. 1a, clear spun lines from each nozzle can be seen on the paper board. These spun lines are a symptom of non-uniform coating.

Example 1

The same intermediate composition as used in comparative example 1 was foamed mechanically using a mixer. The volume increased to over double-fold, as air was incorporated into liquid phase. Thus, the foamed medium formed comprised gas in an amount of about 50%-60% by volume of the total medium. This foamed medium was electro-spun from the nozzles used in comparative example 1 (distance about 50 mm, voltage about 40 kV). The coat weight was kept even in both experiments. The formed particles were deposited on a paperboard of 240 g/m².

Figure 1B:
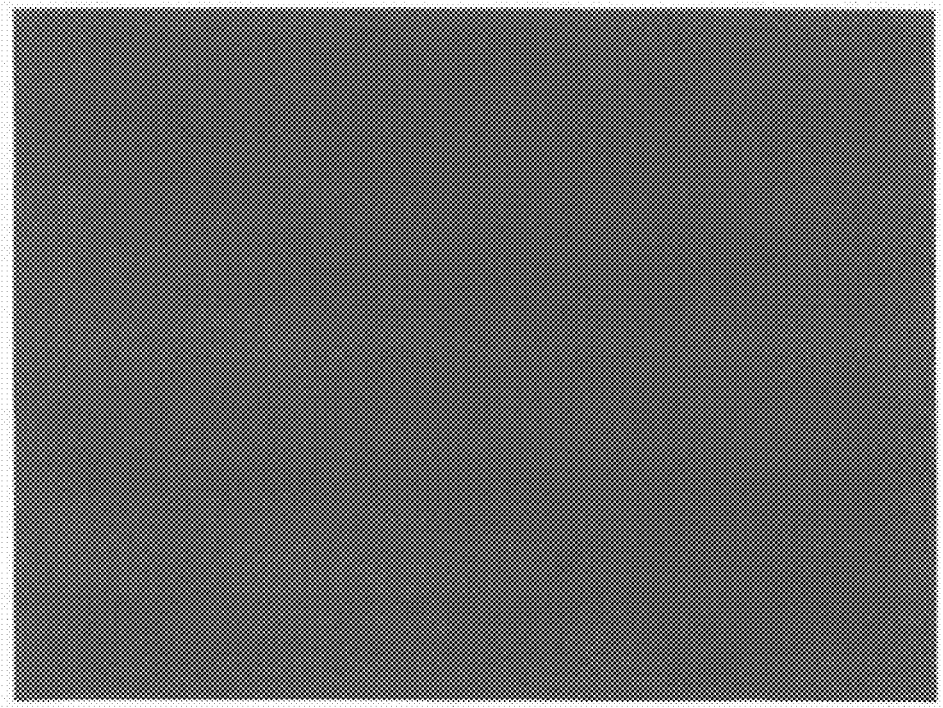
FIG. 1b shows a photo taken under UV light of a paper board that is coated with particles that has been electrospun from a foamed medium in accordance with an example (example 1) of the present invention.

The resulting spread was again assessed visually and by taking photographs under UV light. FIG. 1b shows a photo of the coated paper board taken under UV light. As can be seen in FIG. 1b, the spread uniformity was evidenced as no spun lines from the nozzles were visible on the paper board. From each nozzle, several filaments were ejected towards the collector. The foam was also easier to pump and feed to the nozzles, which contributed to easier dosing. As a result, the coating of the end product was more homogenous and uniformly distributed.

Example 2

An intermediate composition comprising mixture of titanium dioxide, polyvinyl alcohol, polyethylene oxide, ($TiO_2$+PVA+PEO), as compounds to be formed into particles; sodium dodecyl sulphate (SDS) as process aid and water as carrier was prepared. The concentrations of ingredients in a batch of 500 g, were PVA 6.4%, PEO 1.0%, SDS 3 drops and water to balance. The intermediate composition was foamed mechanically using a mixture. 9 g of the foamed medium was spread on a metal plate as a 10 cm×10 cm area and electro-spun (distance about 50 mm, voltage about 40 kV) from the foam surface. Again, the particles formed were deposited on a substrate of paperboard (240 g/m²).

The particles (here fibres) were formed directly form the free surface of the foam, i.e. without any nozzles or the like. The density of fibres leaving the foam surface was high. As the experiment was conducted till the end, all the foam was consumed and spun into fibres without any substantial reagent loss. The concentration seems to stay stable when foamed without gradients disturbing the process. Spinnability did not decrease as function of time. Again, a uniform spread was observed. Moreover, the deposition speed was surprisingly high. The deposition speed was significant higher than when nozzles were used.

The invention claimed is:

1. A method for forming particles or droplets of at least one substance comprising the steps of;
  i) providing a liquid or solid medium that comprises said substance,
  ii) foaming said medium by dispersing gas into said medium in an amount of 50-99% by volume of the total medium,
  iii) feeding foamed medium from step ii) to a feed section,
  iv) forming particles or droplets of said substance by electrospinning or electrospraying said medium from the feed section, and
  v) depositing the particles or droplets on a substrate or collector surface.

2. A method according to claim 1, wherein the foamed medium in step ii) is provided by dispersing a gas in a liquid or in a solid whereby a dispersion of a gas in a liquid or a gas in a solid is formed, whereafter the at least one substance is incorporated into said dispersion.

3. A method according to claim 1, wherein the gas is dispersed in the liquid or in the solid in an amount of 75-99% by volume of the total medium.

4. A method according to claim 1, wherein said liquid is provided by dispersing and/or dissolving said substance in a solvent.

5. A method according to claim 1, wherein said liquid is a melt of said substance.

6. A method according to claim 1, wherein said gas is selected from the group consisting of air, carbon dioxide ($CO_2$), steam ($H_2O$), nitrogen gas ($N_2$), hydrogen gas ($H_2$) and/or a mixture of any of the said gases.

7. A method according to claim 1, wherein the particle formation in step iv) is carried out from a free surface of the foamed medium.

8. A method according claim 1, wherein said substrate is paper or paperboard.

9. A method according to claim 1, wherein the step iv) of forming particles or droplets of said substance by electrostatic processing is performed in the presence of an alternating current (AC) electric field.

10. A method according to claim 1, wherein substantially all of said medium is foamed such that the whole medium is an elastic sponge-like composite having bubbles of substantially uniform size and distribution.

11. The method according to claim 1 wherein said medium includes at least one surface active agent and said substance comprises a polymer or blend of polymers and at least one solid particle additive.

12. The method according to claim 1 wherein the feed section comprises a smooth plate and discharge slot, wherein the foamed medium is allowed to move on the plate to the discharge slot.

13. The method according to claim 1 wherein the feed section comprises a variable width slit through which the foamed medium is fed.

14. The method according to claim 1 wherein the feed section comprises a plurality of nozzles.

15. A method for forming a paper or a paper board, comprising the steps of;
  i. forming a web of paper or paper board,
  ii. providing a liquid or solid medium comprising at least one substance,
  iii. foaming said medium by dispersing gas into said medium in an amount of 50-99% by volume of the total medium,
  iv. feeding foamed medium from step iii) to a feed section,
  v. forming particles or droplets of said substance by electrospinning or electrospraying said medium from the feed section, and
  vi. depositing said particles or droplets on said web of paper or paper board.

16. A method for producing a filter comprising a substrate layer and an electrospun fibrous layer, said method comprising the step of electrospinning fibers from a foamed medium from a feed section onto said substrate, wherein the foamed medium is formed by providing a liquid or solid medium comprising a substance, foaming said medium by dispersing a gas into said liquid or solid medium to an amount of 50-99% by volume of the total medium, and feeding the foamed medium to the feed section.

* * * * *